(No Model.)
C. H. RICHARDSON.
SHIP'S STEERING APPARATUS.
No. 577,931. Patented Mar. 2, 1897.
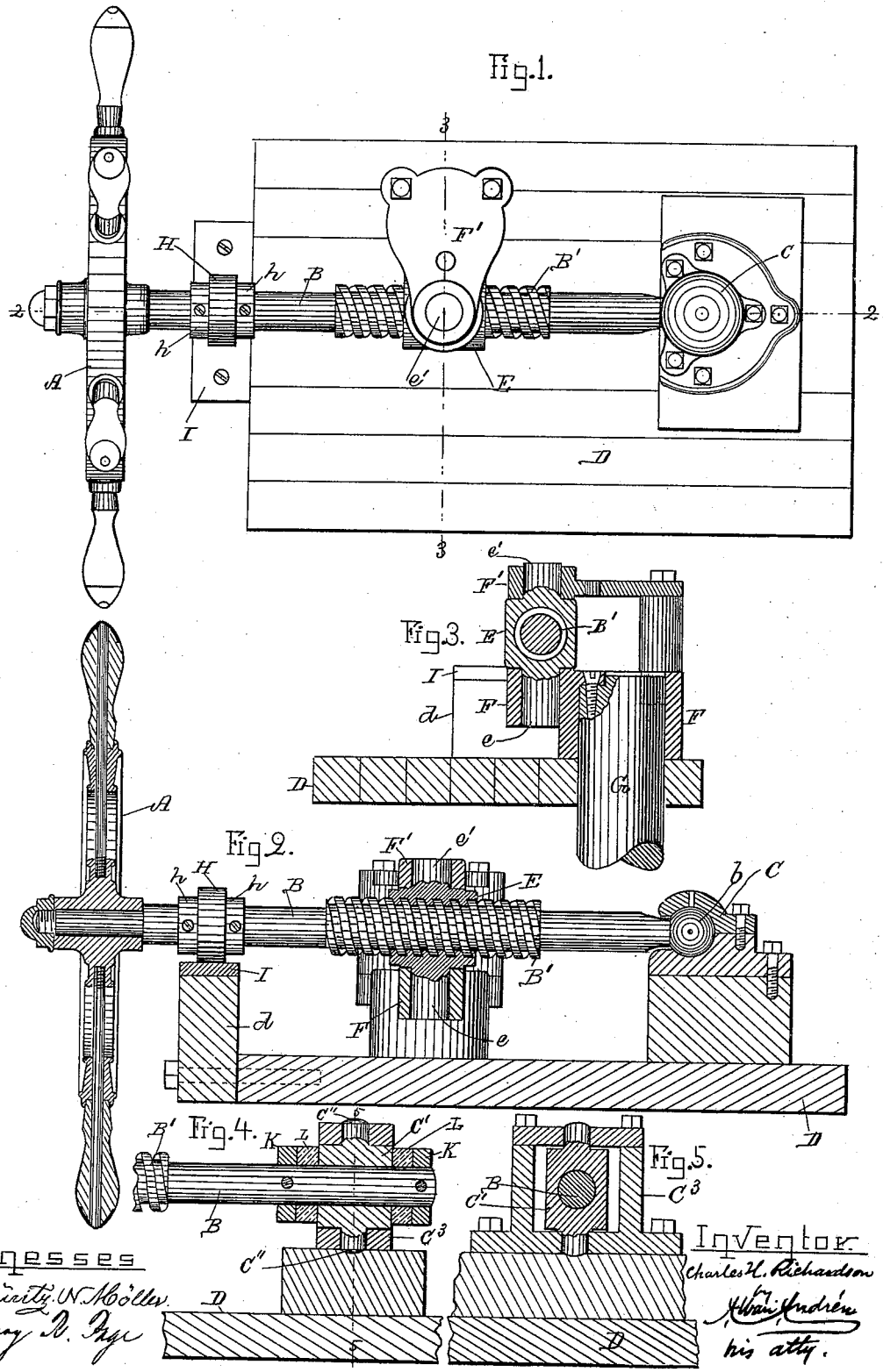

UNITED STATES PATENT OFFICE.

CHARLES H. RICHARDSON, OF GLOUCESTER, MASSACHUSETTS.

SHIP'S STEERING APPARATUS.

SPECIFICATION forming part of Letters Patent No. 577,931, dated March 2, 1897.

Application filed March 23, 1896. Serial No. 584,409. (No model.)

*To all whom it may concern:*

Be it known that I, CHARLES H. RICHARDSON, a citizen of the United States, and a resident of Gloucester, in the county of Essex and State of Massachusetts, have invented new and useful Improvements in Ships' Steering Apparatus, of which the following, taken in connection with the accompanying drawings, is a specification.

This invention relates to improvements in ships' steering apparatus, and it is particularly well adapted for yachts and small vessels, as will hereinafter be more fully shown and described, reference being had to the accompanying drawings, wherein—

Figure 1 represents a top plan view of the improved steering apparatus. Fig. 2 represents a longitudinal section on the line 2 2 in Fig. 1, showing the screw-shaft in elevation. Fig. 3 represents a cross-section on the line 3 3 shown in Fig. 1. Fig. 4 represents a longitudinal section of a modification of the rear bearing for the screw-shaft, and Fig. 5 represents a cross-section on the line 5 5 shown in Fig. 4.

Similar letters refer to similar parts wherever they occur on the different parts of the drawings.

A represents the wheel, secured to the forward end of the shaft B, preferably universally jointed at its rear end, and for this purpose I prefer to make on the rear end of said shaft B a ball $b$, journaled in a ball-bearing C, secured to the deck D or other stationary part of the vessel, as shown. About midway on the shaft B is made a screw-thread B', working in a nut E, having vertical trunnions $e\ e'$, journaled, respectively, in perforations in the crank F and cap F', secured in any suitable or desirable manner to the rudder-post G, as shown.

By turning the wheel A and the shaft B an oscillating motion is imparted to the rudder-post and rudder, and this, as will be seen by reference to the drawings, is accomplished by a single screw and nut instead of the usual right and left screw-threads on the wheel-shaft and corresponding nuts connected by means of links to arms on the rudder-post. For the purpose of preventing a downward thrust or strain on the forward end of the wheel-shaft B, I journal on it a roller H, preferably located on said shaft between collars $h\ h$, as shown in Figs. 1 and 2. Said roller H is supported and adapted to roll on a plate or rail I, secured to the deck D, or a support $d$, attached thereto, as shown. Instead of universally jointing the rear end of the wheel-shaft B in its bearing, as hereinabove described, I may make use of the modification represented in Figs. 4 and 5, in which the rear end of the said shaft is journaled in a bearing C', provided with vertical trunnions C'' C'', journaled in the upper and lower portions of a frame C³, secured to the deck of the vessel or a plate attached thereto, by which the said shaft B is permitted to oscillate in a horizontal plane as it is being rotated.

For the purpose of preventing a longitudinal motion of the shaft B in said bearing C', I secure to said shaft on opposite sides of said bearing the collars K K, and for the purpose of allowing the wheel-shaft B to yield slightly in a longitudinal direction in case of a sudden blow to the rudder I interpose between the ends of the bearing C' and the collars K K rubber or elastic washers or springs L L, as shown in Fig. 4.

By turning the wheel A in either direction the shaft B is rotated, thereby causing the nut E to move on the screw B' of said shaft, and as said nut is journaled to the arm or crank F on the rudder-post the latter will be oscillated relative to the adjustment of said wheel A.

Having thus fully described the nature, construction, and operation of my invention, I wish to secure by Letters Patent and claim—

The herein-described steering apparatus consisting of a wheel-shaft B universally jointed or pivoted at its rear end and having a screw-threaded portion B' engaging a nut E pivotally connected to the rudder-post and a roller H journaled on said shaft and adapted to be supported on a stationary rail or plate I, substantially as and for the purpose set forth.

In testimony whereof I have signed my name to this specification, in the presence of two subscribing witnesses, on this 19th day of March, A. D. 1896.

CHARLES H. RICHARDSON.

Witnesses:
CYRUS STORY,
FRANK E. SMOTHER.